Figure 1:
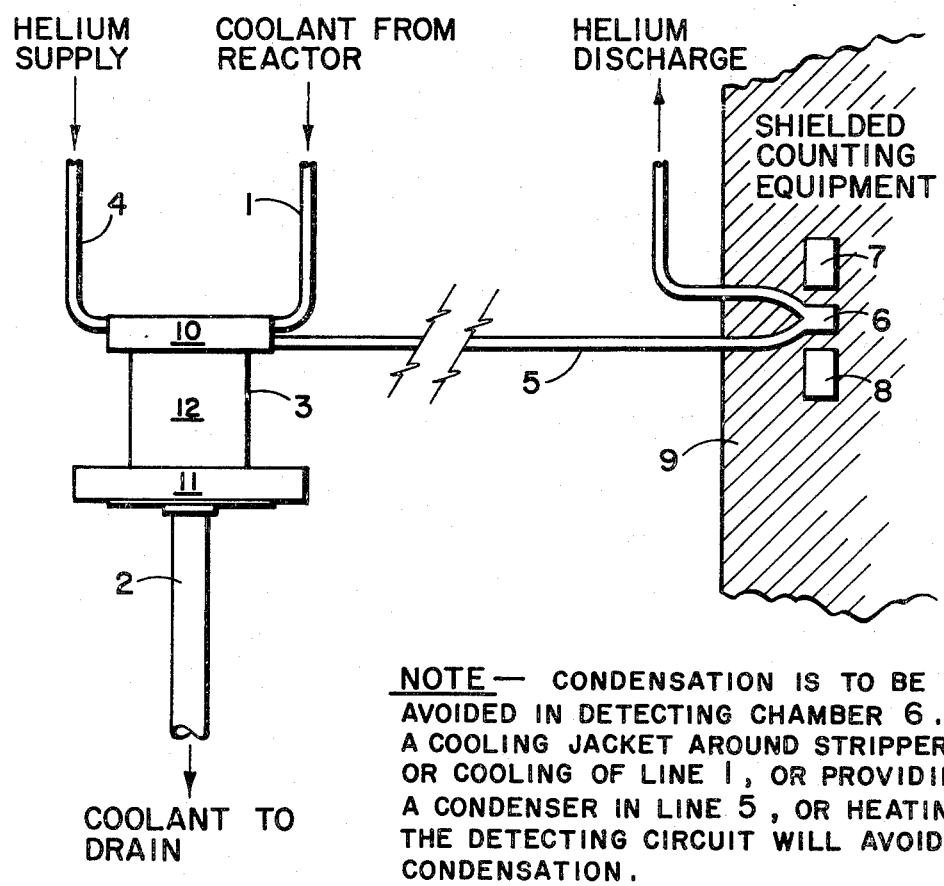

— Patented Aug. 29, 1961

2,998,519
METHOD AND APPARATUS FOR DETECTING GASEOUS FISSION PRODUCTS
Philip Robert Tunnicliffe, Deep River, Ontario, Angus Charles Whittier, Peterborough, Ontario, and George Allan Wikhammer, Deep River, Ontario, Canada, assignors to Atomic Energy of Canada Limited, Ottawa, Ontario, Canada, a company incorporated
Filed Apr. 24, 1958, Ser. No. 730,661
5 Claims. (Cl. 250—83)

This invention relates to method and apparatus for detecting the presence of gaseous fission products in a liquid medium in the presence of other radioactive materials and while of more extended utility, is particularly suitable for detecting failures of the sheathing of nuclear fuel elements inserted in a liquid cooled nuclear reactor.

As is well known, failures in the sheathing of nuclear fuel elements in nuclear reactors present very serious problems, and such sheath failures can result in costly damage and immobilizing of equipment for long periods. It is desirable that sheath failures be easily and quickly detected at the earliest possible stage of failure, and before widespread damage is caused.

In reactors wherein the fuel elements are cooled by a circulating liquid, failures in sheaths of fuel elements are attended by the presence of fission products in the coolant, and it has been previously proposed to detect sheath failures by examining the radioactivity of the effluent coolant. It is known to use ordinary beta and gamma counters to examine radioactivity of the coolant; in addition special equipment has been designed which makes use of boron-containing proportional counters inserted in the coolant to detect fast neutrons.

Such procedures detect fission products in the coolant which have been leached from the nuclear fuel, but have achieved limited success owing to the fact that radioactive materials are produced in the coolant other than those arising from sheath failures and this tends to obscure the presence of fission products from sheath failures. Since it is in the early stage of failure that it is important to know the state of affairs, the effect mentioned make prior detecting devices limited in sensitivity. The effects which obscure detection of sheath failures by prior methods are principally nuclear activation of the coolant by the reactor itself in normal operation, and nuclear fuel contamination on the outside of the fuel sheaths, which effects are referred to as "background."

When a sheath failure occurs, certain fission products appear in the coolant, and it has been found by the present inventors that very sensitive indication can be achieved if the gaseous fission products are detected. Detection of such gaseous fission products is preferably carried out, briefly, by treating a sample of the coolant in such a manner that a fraction of any gaseous fission products dissolved therein are separated from the coolant into a stream of gas which is not radioactive (denoted herein as "non-radioactive gas"). The non-radioactive gas containing the gaseous fission products is then conveyed to a shielded location to eliminate extraneous radioactivity, and at such location a suitable detector shows the presence of any radioactive gases.

The separation of the gaseous fission products from the coolant and the introducing of these products into the non-radioactive gas is carried out in an apparatus, referred to herein as a "stripper," which may have a number of different forms.

It is possible to carry out the present invention either with a stripper which provides an interface between the liquid coolant and the non-radioactive gas, thus allowing some of the radioactive gases to diffuse into the non-radioactive gas, or else with a stripper which causes the radioactive gases to be removed from the liquid coolant and then mixed with the non-radioactive gas.

Examples of the apparatus providing an interface between the liquid coolant and the non-radioactive gas are: a bubble chamber wherein the non-radioactive gas is bubbled through the liquid coolant; a spray tower where the liquid coolant is sprayed into an atmosphere of the non-radioactive gas, and a falling film chamber wherein a controlled area of liquid coolant surface, constantly replenished by fresh liquid coolant, is presented to the non-radioactive gas. It is the latter apparatus which is specifically referred to herein, by way of example.

Examples of a stripper which causes the radioactive gases to be removed from the liquid coolant generally involve a step of condensing vaporized liquid coolant and a specific example is a fractioning column or still wherein the liquid coolant is condensed while the gaseous fission products remain gaseous.

It will be realized that the vapour from boiling coolant might be used under certain circumstances as carrier gas for the radioactive gases.

The invention will now be described with the assistance of the accompanying drawings wherein one form of the apparatus embodiment of the invention is shown. As mentioned above, the apparatus is capable of considerable modification, and the accompanying drawings are accordingly to be considered as by way of example and not in limitation.

Figure 2:
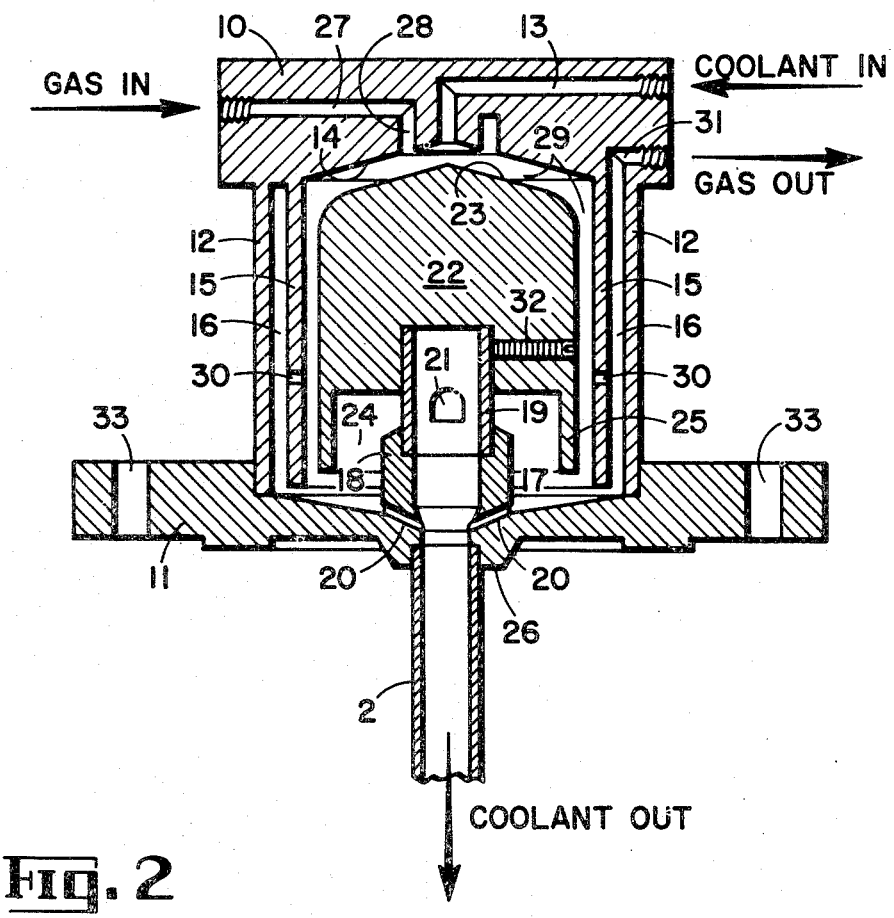

In the drawings, wherein like parts are denoted by identical reference numerals throughout, FIGURE 1 shows a diagrammatic view of one form of apparatus embodying the present invention; and FIGURE 2 shows an enlarged cross-sectional view of the stripper, denoted by reference numeral 3 in FIGURE 1.

Referring to the drawings, a reactor (not shown) has coolant circulating therethrough, which may be, for example, heavy water. It is contemplated that by means of the method and apparatus herein disclosed, it will be possible to detect sheath failures by noting an increase in the presence of gaseous fission products in the coolant water. The main features of the method and apparatus will now be outlined.

A sample of the coolant is received through a tube denoted by 1, the sample of coolant is passed through the stripper denoted by 3 and emerges from stripper 3 through a tube denoted by 2. Non-radioactive gas, for example helium, enters stripper 3 through a tube denoted by 4, passes through stripper 3 and emerges from stripper 3 through a tube denoted by 5. As the non-radioactive gas emerges from stripper 3, it carries with it a part of gaseous fission products which may be present in the coolant flowing through stripper 3. Such gaseous fission products, if any, are detected at a detecting chamber denoted by 6.

Referring again to the flow of the coolant through stripper 3, the coolant in the reactor normally will be under pressure, and since, for the purposes of the apparatus of the present invention, only sufficient pressure is necessary to pass the sample of coolant through stripper 3, a reducing valve (not shown) may be provided in tube 1. The coolant passes from stripper 3 through tube 2, and may, if desired, be pumped back to the reactor (not shown).

The non-radioactive gas passing through stripper 3, entering through tube 4, leaving through tube 5, and passing to detecting chamber 6 may, as mentioned above, be helium.

The stripper 3 will function just as well with other non-radioactive gases, and helium will be referred to specifically by way of example. It is not necessary that such gas used be chemically inert but only that it be non-radioactive and of a character such that it does not combine with the coolant to produce directly or indirectly undesirable substances. Air, for example, dissolves in the coolant and nitrogen cations are formed, which, under the action of nuclear radiation if the coolant is recycled, produce in turn substances which are corrosive.

In stripper 3 a falling film of liquid presents a large surface area to the carrier non-radioactive gas flowing concurrently with the film and a fraction of any dissolved gases in the liquid diffuse through the surface of the film into the carrier non-radioactive gas.

By means of the stripper 3 just described, a fraction of any gaseous fission products is stripped from the coolant and is carried out of stripper 3 through tube 5.

The effluent gas from the stripper passes through tube 5, to a detecting chamber, denoted by 6, in proximity of which one or more counters denoted by 7 and 8 may be placed. Counter 7 could, for example be a beta counter and counter 8 a gamma counter; determining the intensity of the beta and gamma radiations from detecting chamber 6 will sufficiently identify the presence of gaseous fission products in the gas therein, and hence denote a sheath failure.

In order to keep the detecting portions of the apparatus away from the background radioactivity, a suitable shield denoted by 9 is provided.

In a practical embodiment of this invention it has been found that among the gaseous fission products produced by a sheath failure are radioactive isotopes of xenon and krypton, which are easily detected in the manner mentioned. It has also been found that no other radioactive gases contribute appreciably to the activity in the helium; when there is no sheath failure the only activity present under these conditions are those of gaseous fission products originating from uranium contamination.

In order to circulate the helium through tubes 4 and 5, a suitable pressure differential is maintained between the helium supply and discharge. It is possible to recirculate the helium provided suitable means are provided to remove the gaseous fission products. A storage volume which delays the helium for a sufficient time to allow the fission products to decay, or a charcoal trap cooled in liquid air may be used.

One form of the stripper 3, namely the falling film chamber form, will now be described with reference to FIGURE 2. The externally visible features of stripper 3 are an upper flange denoted by 10, a lower flange denoted by 11 and a cylindrical wall connecting flanges 10 and 11, denoted by 12. Upper flange 10 has a passage therein denoted by 13 through which coolant enters stripper 3, and passage 13 terminates in the center of flange 10 at the top of a shallow dome denoted by 14.

Cylindrical wall 12 is rigidly connected to or integral with flange 10, and a similar but smaller inner cylindrical wall, denoted by 15 is also either rigidly connected to flange 10 or integral therewith. Walls 12 and 15 are coaxial, and a space therebetween forms a section of the passage for helium or other carrier gas denoted by 16 wherein included vapour is condensed on the inner surface of wall 12 which is maintained at a low temperature by a cooling jacket (not shown). The purpose of such a cooling jacket is to prevent condensation forming in detecting chamber 6, and many other expedients for the same purpose as noted in FIGURE 1 may be used, for example lowering the temperature of the coolant before it reaches the stripper, heating the entire detecting chamber circuit, or inserting a condenser in line 5.

Lower flange 11 is rigidly bonded to wall 12 at a suitable recess in flange 11, such that a liquid-tight fit is made.

At the inside central part of flange 11, a shallow depression, denoted by 17 is provided, and a centrally-disposed boss denoted by 18 occupies the center thereof. A short tube, denoted by 19 is rigidly mounted on boss 18 so that the inside of boss 18 and tube 19 are flush. Boss 18 is provided with a plurality of diagonal ports denoted by 20 and tube 19 is provided with a plurality of large openings, denoted by 21.

It will be seen that openings 21 have flat edges on their lower sides, and this is to maintain the coolant level at such edges in the manner of a weir. Diagonal ports 20 pass some liquid in normal use but their chief function is to allow depression 17 to drain when the supply of coolant through pipe 1 is cut off, and when it is desired to remove the device from service.

The upper end of tube 19 is closed by a circular former denoted by 22 having a dome denoted by 23 of shape similar to dome 14 of flange 10. Former 22 is rigidly locked on tube 19 by means of a set screw denoted by 32. The lower part of former 22 is provided with a recess, denoted by 24, surrounded by an integral skirt denoted by 25.

On the lower side of flange 11 is provided a boss denoted by 26 for receiving tube 2, and a continuous channel is provided from tube 19, through boss 18, through boss 26 and tube 2.

Upper flange 10 has a passage therein denoted by 27 through which helium or other carrier gas enters the stripper. Passage 27 terminates in an annular recess denoted by 28 which distributes the carrier gas radially to a flow passage denoted by 29 between flange 10, wall 15 and former 22. Wall 15 is provided with a plurality of small openings denoted by 30 which connect passage 29 to passage 16. Flange 10 has a passage therein denoted by 31 through which carrier gas and gaseous fission products leave the stripper.

Flange 11 will ordinarily be mounted on other apparatus, and bolt holes denoted by 33 are provided.

The operation of the apparatus herein described will be apparent from the foregoing, but for greater certainty will now be reiterated. Coolant passing through stripper 3 will enter through passage 13 and will descend as a flowing film on former 22 through passage 29. Some of the coolant will pass to tube 2 through drainage ports 20, and some of the coolant will go up into and through recess 24, through openings 21 into tube 19 and thence into tube 2. Openings 21 will form a weir which defines a liquid level within stripper 3 at normal operating flow rates such that openings 30 are not submerged and such that a liquid seal is maintained between passage 29 and passage 16, and between passage 29 and recess 24.

At the same time as the coolant is passing in a downward direction in the manner mentioned, helium or other carrier gas will enter passage 27 and flow from recess 28 concurrently with the liquid stream in passage 16, and thence through passage 31 and tube 5 to detecting chamber 6.

Since a large area of liquid film is exposed to the helium or other carrier gas a significant amount of fission product gases dissolved in the liquid will diffuse through the surface and enter the parallel carrier gas stream. This stripping and carrying action is adequate to transfer to the counting device sufficient gaseous fission products that in the event of sheath failure, detection of the failure is readily made.

We claim:
1. A method of detecting gaseous fission products in effluent liquid consisting of the steps of diverting part of said liquid and maintaining said diverted liquid substantially in motion, treating said diverted liquid with non-radioactive gas to strip any gaseous fission products from said liquid and leading said non-radioactive gas having a portion of any gaseous fission products dissolved therein to a detecting chamber shieldably separated from radiations.

2. A method as defined in claim 1 wherein said stripping is carried out by exposing said liquid to said inactive gas at an interface.

3. A method of detecting gaseous fission products in effluent liquid comprising the steps of diverting part of said liquid, maintaining said liquid substantially in motion, treating said diverted liquid with continuously-flowing non-radioactive gas to strip any gaseous fission products from said coolant and continuously leading said non-radioactive gas having a portion of any gaseous fission products dissolved therein to a detecting chamber shieldably separated from radiations and there detecting the presence of fission products in said gas.

4. A method according to claim 3 having in addition the step of continuously circulating the non-radioactive gas through said stripper chamber and said detecting chamber.

5. A method of detecting gaseous fission products in effluent liquid where such effluent liquid is in a boiling condition, consisting of the steps of separating the vapour of such effluent liquid from such effluent liquid, continuously leading said vapour to a detecting chamber shieldably separated from radiations and there detecting the presence of fission products in said vapour.

References Cited in the file of this patent
UNITED STATES PATENTS

| | | |
|---|---|---|
| 2,807,580 | Fenning et al. | Sept. 24, 1957 |
| 2,823,179 | Snell et al. | Feb. 11, 1958 |

FOREIGN PATENTS

| | | |
|---|---|---|
| 793,905 | Great Britain | Apr. 23, 1958 |